INVENTOR.
MEREDITH M. NYBORG.
BY
ATTORNEY.

INVENTOR.
MEREDITH M. NYBORG,
BY
Walter R. Thiel
ATTORNEY.

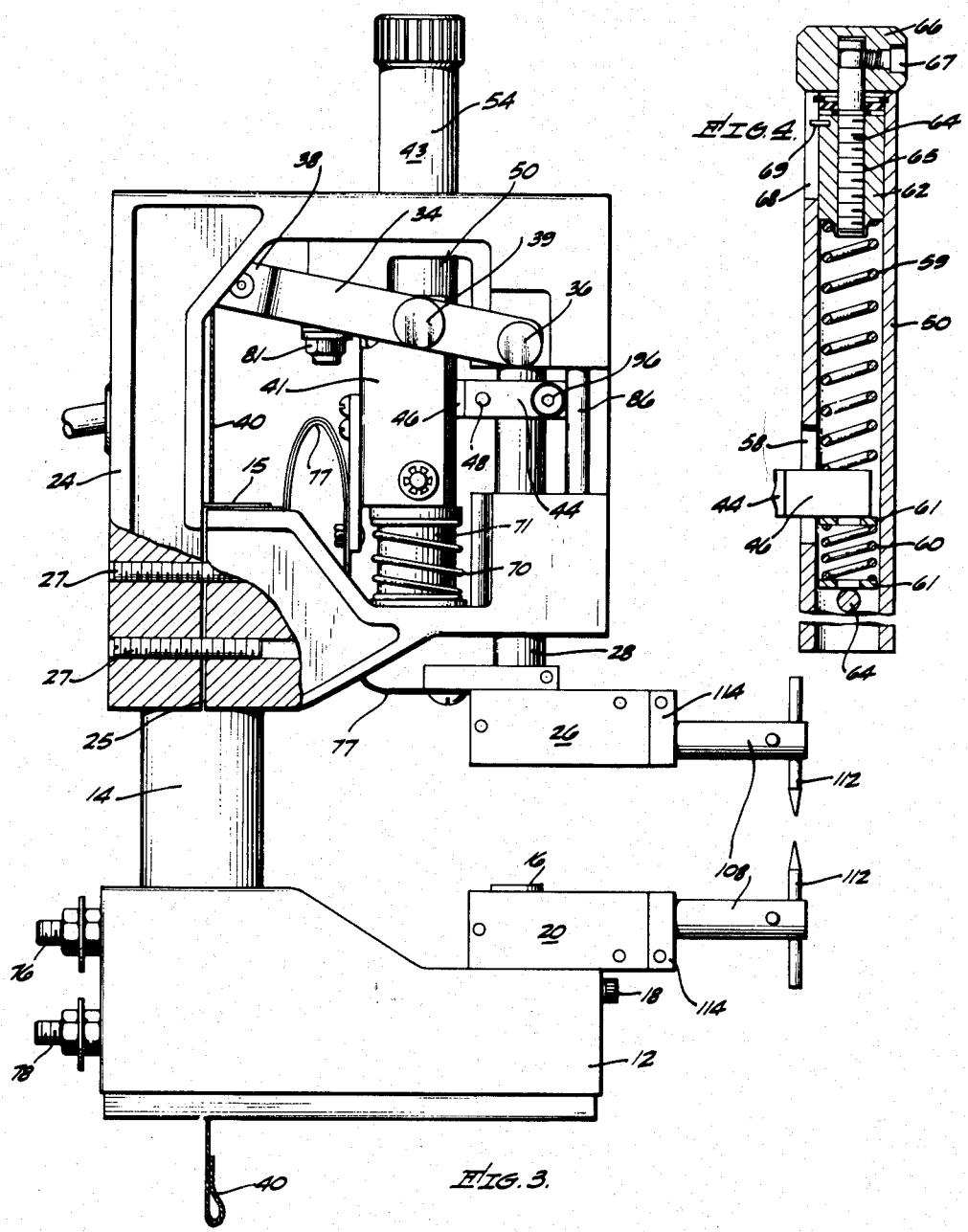

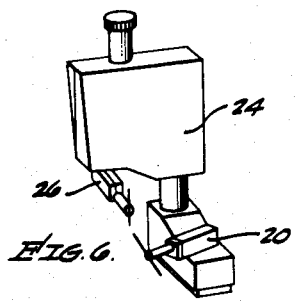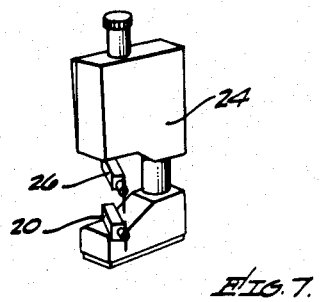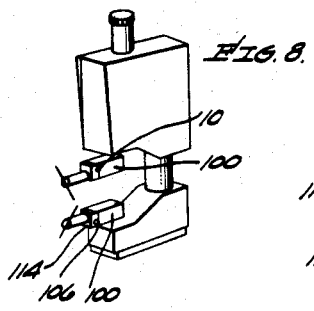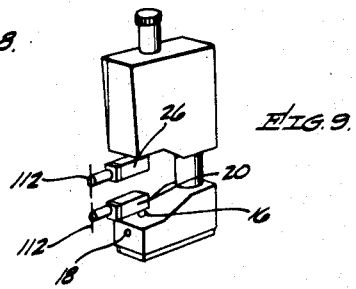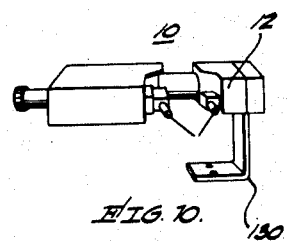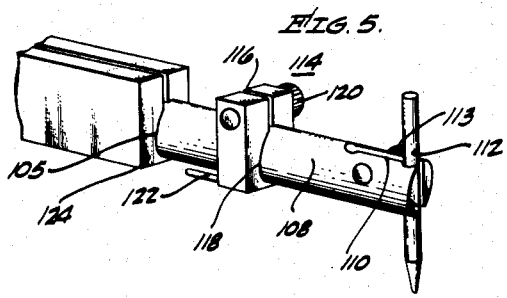

United States Patent Office 3,140,381
Patented July 7, 1964

3,140,381
PRECISION WELDING HEAD
Meredith M. Nyborg, Camarillo, Calif., assignor to Hughes Aircraft Company, Culver City, Calif., a corporation of Delaware
Filed May 31, 1963, Ser. No. 284,459
5 Claims. (Cl. 219—86)

This invention relates to a welding head and more particularly to an improved resistance welding head adaptable for spot welding operations.

Generally, a resistance welding head includes a first electrode supported in a fixed position and a second electrode mounted on a carrier member which is movable with respect to the first electrode. The work is normally disposed between the two electrodes and a force is applied to the movable electrode so as to urge it against the work. When this force reaches a preselected magnitude a switch is actuated which completes an electrical circuit. Welding current then flows between the electrodes and through the work and welding occurs at the precise electrode force appropriate for a proper weld.

While presently available heads of the type above described are of utility in some spot welding applications their use is limited because of the rigid, inflexible, positioning of the electrodes.

Therefore, an object of this invention is to provide an improved resistance welding head.

Another object of this invention is to provide an improved welding head having adjustable electrode assemblies and frame member so that it may be used for difficult welding operations.

A further object of this invention is to provide an improved welding head having a registering member mounted on the electrode arms to facilitate electrode positioning for repetitive welding operations.

According to the present invention the adjustability of the electrode assemblies and head assembly is achieved by rotatably mounting each of them by set screw on shafts so that an operator can locate the electrodes in virtually any position required by loosening only one or two set screws. To provide a facility for rapid setup of repetitive welding schedules a registering block having an indexing pin mateable with the electrode clamp is clamped on the electrode horn so that the electrode can be arranged in a specific configuration merely by inserting the horns into the clamps.

These and other objects and advantages will be apparent from the following description taken in accordance with the drawings throughout which like reference characters indicate like parts, and in which:

FIG. 3 is an elevational view of the left side of the embodiment of the present invention shown in FIG. 1 and having a portion of the frame cut away illustrating the clamping slot and clamping screws;

FIG. 4 is a medial sectional view of the welding force control cylinder and a portion of the yoke assembly showing the projection therefrom illustrating the mechanism utilized to provide a controllable welding force;

FIG. 5 is an enlarged perspective view of the movable electrode and a portion of the upper clamp illustrating the clamping of the registering block on the electrode horn to facilitate the positioning of the horn in the clamp;

FIG. 6 is a perspective view of the present invention illustrating an arrangement of the welding head wherein the frame and electrode assemblies are rotated to a side position;

FIG. 7 is a perspective view of the present invention illustrating an arrangement of the welding head wherein the electrode assemblies are rotated to a side position with the frame remaining in a fixed position;

FIG. 8 is a perspective view of the present invention illustrating an arrangement of the welding head wherein the electrodes are rotated to a side position with the frame and electrode assemblies remaining in a fixed position;

FIG. 9 is a perspective view of the present invention illustrating an arrangement of the welding head wherein the head is adaptable to accommodate varying thickness workpieces by the raising or lowering of the shaft to which the fixed electrode is mounted; and FIG. 10 is a perspective view of the present invention illustrating an arrangement of the welding head wherein is shown the mounting of the head in a horizontal position by the attachment of it to an L-shaped bracket to permit the performance of welding operations on long workpieces.

Figure 1:
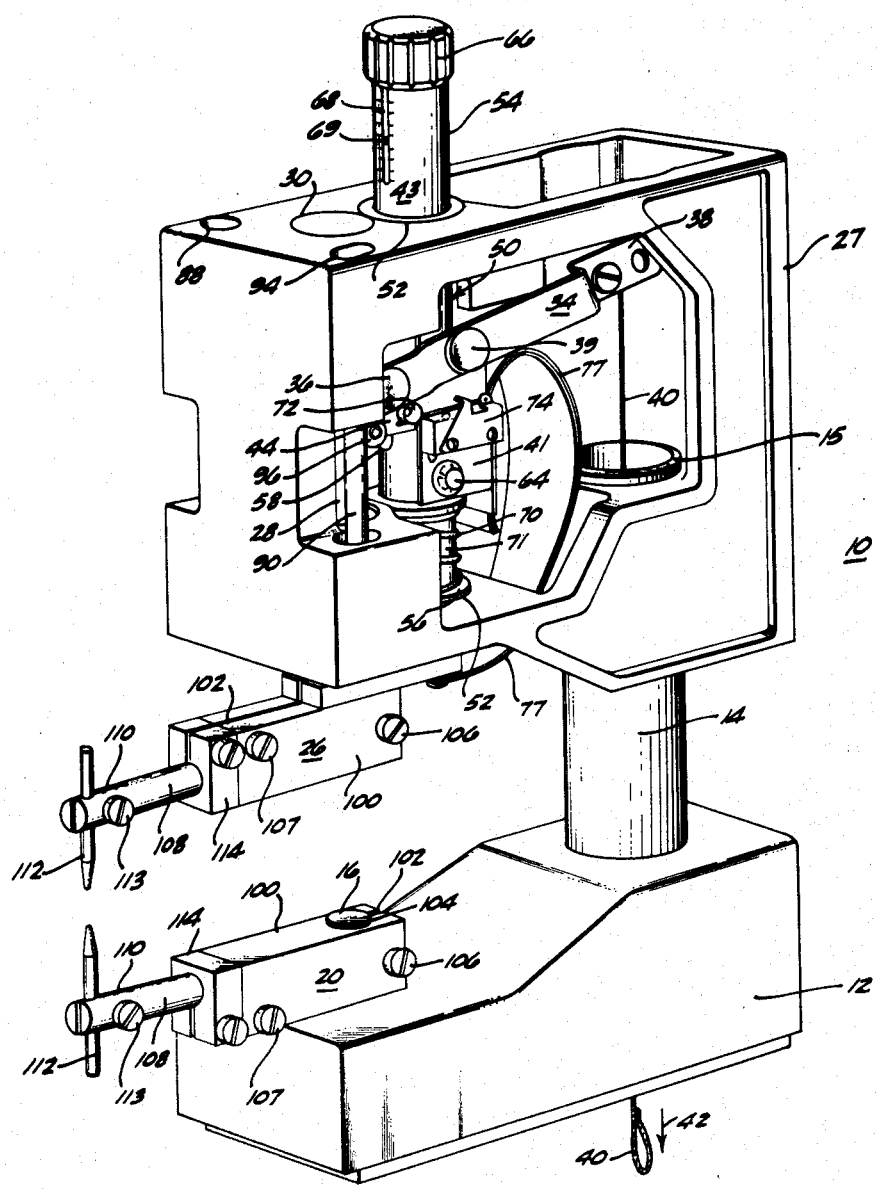
FIGURE 1 is a perspective view of an embodiment of the present invention showing the head with the cover removed to illustrate the structural elements positioned therein.
Figure 2:
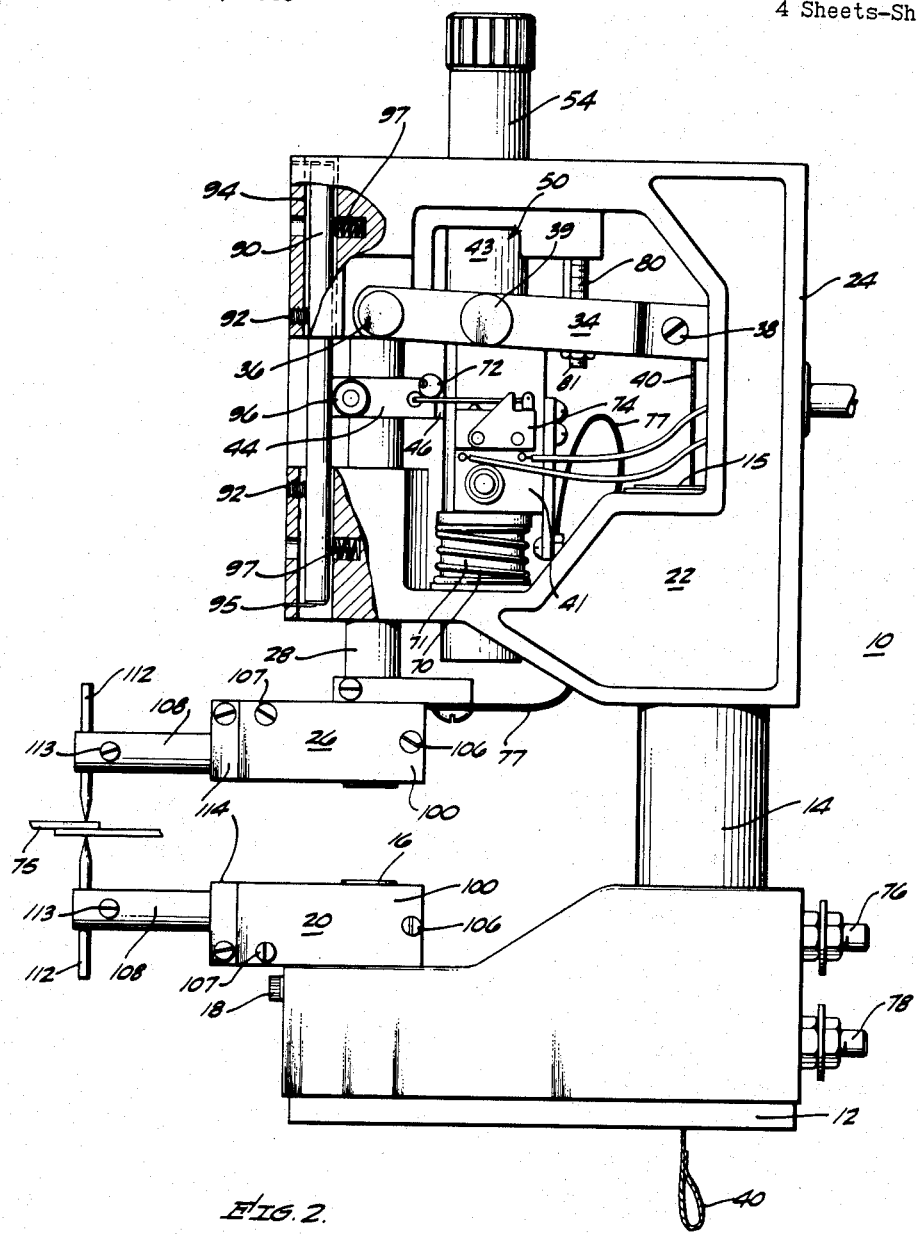
FIG. 2 is a side elevational view of the present invention as viewed from the right side of the embodiment shown in FIG. 1 showing the electrodes in contact with a workpiece and having a portion of the frame cut away showing one of the guide rods and the alignment set screws and springs.

Referring now to FIGS. 1, 2, and 3, there is shown a welding head 10 consisting of a base or platform 12 having a cylindrical portion 14. The base 12 may be of a material such as aluminum which has been copper plated to provide low electrical surface resistance. A column 15 of an electrically conductive material such as brass extends through the cylindrical portion 14 into the base 12 and is coated with a conventional electrical insulating material to insulate it from the base 12 and the cylindrical portion 14. The column 15 is of a length sufficient to allow a portion of it to extend above the top of the cylindrical portion 14 so that a frame member 24, of a material such as anodized aluminum can be mounted thereon by a pair of set screws 27 threaded into bores extending across a slot 25 in the frame 24 adjacent to the column 15.

A shaft 16, of a material such as copper which may have been gold plated, is secured by a clamping screw 18 in a bore in the base (not shown) and has pivotably mounted on it a first or fixed electrode assembly 20. A second or movable electrode assembly 26, substantially similar in structure to the first assembly 20, is mounted to one end of a carrier or ram member 26 or such as a shaft of case hardened steel that is journalled in a pair of ball bearing bushings retained in a bore 30 in the frame 24 so that its longitudinal axis is coaxial with the longitudinal axis of the shaft 16.

A lever arm 34 of a material such as steel is pivotably attached to the frame 24 at a first end 36, to a welding force member 40 at a second end 38 and to a bracket 41 attached by conventional means to a welding force control assembly 43 at an intermediate point 39. The welding force member 40 is shown typically as a cable that extends through the cylindrical portion 14 to a foot pedal (not shown) for the application of an operating force. While the welding force member has been shown as a cable it should not be limited thereto since conventional hydraulic, pneumatic, or electrical operating means may be substituted without varying from the scope of the invention. The application of a force to the cable 40 in a direction indicated by an arrow 42, FIG. 1, results in the pivoting of the lever arm 34 and the movement of the welding force control assembly 43 in the same direction. To transmit this motion to the shaft 28, a yoke assembly 44 of a material such as aluminum having a finger or projection 46 extends into contact with the welding force control assembly 43 and is clamped to the shaft by a clamping screw 48.

Referring now to FIG. 4, as well as to FIG. 1, the welding force control assembly 43 includes a cylindrical housing 50, of a material such as anodized aluminum, which is positioned in a bore 52 in a pair of opposite sides of the frame so that it is substantially parallel with the shaft 28, and has a length which is greater than the transverse dimension of the frame at this point. Thus by positioning the housing 50 in the bore 52, with one end substantially flush with the outer edge of one side of the frame, a portion 54 of the housing will extend outward from the other side. To facilitate the movement of the housing 50 in the bore 52 a member 56 having a low coefficient of friction such as a Teflon sleeve or a roller bearing may be positioned in the bore before the housing is inserted therein.

The housing 50 contains an elongated aperture 58 at a point along its length substantially opposite the yoke assembly 44 so that the finger 46 extends into the cylindrical chamber of the housing into contact with a pressure spring 59 which is retained between one side of the finger 46 and a pressure adjustment nut 62. A tare spring 60 is retained by a pair of washers 61 between the other side of the finger 46 and a pin 64 positioned transversely of the chamber and imparts to the pressure spring 59 a biasing force sufficient to maintain it seated against the adjustment nut 62 and the finger 46. The adjustment nut 62 contains a threaded bore 65 into which is threaded a pressure adjustment shaft 64 having an adjustment knob 66 attached to it by a conventional set screw 67 and a dowel 69 extending into a slot 68 in the housing 50 to prevent rotation of the nut 62. By rotating the shaft 64, by means of the knob 66, the pressure adjustment nut 62 is moved up and down the shaft 64. Thus the force applied by the yoke assembly 44 by the movement of the nut 62 is selectively varied to any magnitude as may be desired to be preselected for the welding operation. To provide a visual indication of the welding force for the scheduling of preselected forces, the slot 68 includes a plurality of graduations along its edge so that the relative magnitude of the force is readily determinable by the location of the dowel 69 along the edge.

After each welding operation, to insure an automatic return of the movable electrode assembly 26 to a retracted position as illustrated in FIGS. 1 and 3, a return spring 70 having its ends retained between the frame 24 and the bracket 41 circumscribes a portion 71 of the cylindrical housing 50. As the lever arm 34 is rotated clockwise as viewed in FIG. 1, by the application of operating force to the cable 40, the resulting movement of the welding force control assembly 43 compresses the spring 70 sufficiently to build up in it a force which will return the movable electrode assembly 26 to the retracted position when the operating force is removed.

Referring again to FIGS. 1 and 2, an adjustable cam member 72 is secured to the yoke assembly 44 in contact with the switch arm of a switch 74 such as a conventional microswitch which is attached to the bracket 41 so that when the movable electrode assembly 26 is in the retracted position the switch arm places sufficient pressure on the switch 74 to maintain it in a deactivated state. As long as the motion of the welding force control assembly 43 is transmitted to the yoke assembly 44 the switch 74 will remain deactivated. Therefore, during the movement of the movable electrode assembly 26 into engagement with a workpiece 75, the switch 74 cannot be activated because the movement of the assembly 43 is transmitted to the yoke 44 through the pressure spring 59. Since the movable electrode assembly 26 and correspondingly the yoke assembly 44 are restricted from further movement by the workpiece 75, any additional force will be applied directly to the workpiece against the preselected force of the pressure spring 59 until the operating force reaches the magnitude of said preselected force, thereafter the welding force control assembly 43 moves sufficiently to actuate the switch 74. A first and a second terminal 76, 78, such as conventional lugs, extend out from one side of the base 12. The first lug 76 is threaded into a bore in the column 15 and is electrically insulated from the base 12 while the second lug 78 is threaded directly into a bore in the base 12. Therefore, when a stored energy welding power supply (not shown) such as that described and shown in U.S. Patent No. 2,483,691 by J. W. Dawson, issued October 4, 1949, is connected to the lugs 76, 78, the actuation of the switch 74 enables the power supply to supply electrical energy through the path provided from the second lug 78, the base 12, and the shaft 16 to the first electrode assembly 20 and the workpiece 75 and to the movable electrode assembly 26, a conductor 77, such as a copper strap, coupling the movable electrode assembly 26 to the column 15, and to the first lug 76.

To eliminate the possibility of the application of an excess amount of welding force to the workpiece, a restraining member 80 such as a screw having a long shaft is threaded into a nut 81 rigidly positioned on the bracket 41. The shaft of the screw 80 extends into a bore in the frame (not shown) and is adapted to have the head thereof engage the frame 24 after the desired vertical movement of the movable head to accommodate workpieces of varying thicknesses. In this fashion the magnitude of the vertical movement of the movable electrode assembly 26 may be controlled by varying the length of the screw 80.

Referring to FIGS. 1, 2, and 3, a rotation control mechanism is illustrated which includes a first guide rod 86 retained in the present embodiment by a pressure fit in a bore 88 in the frame 24 on one side of the shaft 28, a second guide rod 90 retained by a pair of adjustment screws 92, such as flat head set screws threaded into bores in the frame, in a slotted hole 94 on the opposite side of the shaft 28, and attached to opposite sides of the yoke assembly 44 for engagement with the first and second guide rods a pair of antifriction members 96 such as conventional roller bearings. To counteract the force applied by the set screws to the guide rod 90 a pair of springs 97 are retained in bores in the frame and bear against the rod on the opposite side thereof from the set screws. To prevent the guide rod 90 from falling out of the slotted hole 94 during adjustment and positioning thereof a retaining pin 95 is inserted in a bore in the frame near both ends of the slotted hole 94. While, in the present embodiment, the guide rods have been shown to be positioned in bores in the frame 24 it should be understood that if desired the guide rods may be positioned in slots having suitable retaining pins instead of the bores.

To provide a welding assembly adaptable to numerous welding operations the first and second electrode assemblies 20, 26 contain numerous adjustable features. The first electrode assembly 20 and the second electrode assembly 26 include substantially the same structure; however, the second electrode assembly incorporates suitable modifications so that it can be adjusted from the same side of the welding head as the first electrode assembly 20. As best seen in FIG. 1 each of the assemblies includes a clamp member 100 of a material such as aluminum which has been first copper plated and then gold plated, having a groove 102 extending longitudinal thereof of a depth sufficient to extend into a transverse mounting bore 104 and a longitudinal electrode horn retaining bore 105, FIG. 5. Each assembly also includes a pair of threaded bores each adapted to receive a clamping screw 106, 107 for clamping respectively the clamp member 100 to the appropriate shafts of the welding head and an electrode horn 108 in the clamp 100. The horn 108 is of a material such as a suitable copper alloy which may be gold plated. Each of the electrode horns 108 is typically a cylindrical shaft having at one end a notch 110 and a bore adapted to receive an electrode 112 and a threaded bore having an axis extending at right angles to the notch 110 adapted to receive a clamping screw 113 for clamping the electrode 112 in the electrode horn 108. The electrode 112 is typically of a material such as a copper alloy.

Referring to FIG. 5, intermediate the ends of the electrode horns 108 is a registering member or collar 114, of a material similar to that of the clamp member 100, which includes a groove 116 and an aperture 118 through which the horn extends and a threaded bore having a set screw 120 therein for clamping the block on the horn 108. At one corner of the collar 114, pressed into an aperture therein, is a tapered guide pin 122 which is mateable with a tapered aperture 124 in the clamp 100.

In the assembly line fabrication of modules or assemblies many welding schedules, requiring different electrode positions, are used and if the module or assembly is complex, many of the schedules will be repeated. Therefore, since each horn 108 includes a collar 114, which remains clamped on the horn when it is removed from the clamp 100 for the setting up of a new welding schedule, if a number of electrode horns with collars attached are maintained, a welding setup can be repeated in a short time, without having to reposition the electrode horns. This can be accomplished merely by inserting the horn 108 into the bore 105 and mating the pin 122 on the collar with the aperture 124 in the clamp 100.

Because of the adjustable features of the welding head 10, as described above, it is able to handle simple straightforward precision welding and also the more difficult operations in hard to reach locations on complicated assemblies. As seen in FIGS. 6, 7, 8, 9, and 10, the electrodes 112 can be oriented in many different directions by loosening only two or three screws. FIG. 6 illustrates the rotation of the frame 24 by the loosening of the screws 27, shown in FIG. 3, and the rotation of the first electrode assembly 20 and the second electrode assembly by the loosening of the clamping screw 106, shown in FIG. 1. This provides a welding head which allows workpieces to enter from the front or from either side of the assembly. In FIG. 7 is illustrated the rotation of both the first and second electrode assemblies 20, 26 by loosening the clamping screws 106, with the frame 24 remaining in a fixed, unrotated position.

In FIG. 8 is shown the rotation of the electrode horns 108 by the loosening of the clamping screws 107, FIG. 1. Since the horns 108 have a cylindrical shape they can be rotated through a full 360° of arc relative to the longitudinal axis of the bore 105, FIG. 5. Therefore, for unique operations, the horns 108 need only be positioned once and the collar 114 clamped thereon so that setup procedures can be repeated simply for repetitive operations of a specific welding schedule by removing one horn from the bore 105 and inserting another one.

FIG. 9 illustrates the repositioning of the fixed electrode assembly 20 relative to the movable electrode assembly 26 by the use of the base clamping screw 18 and the shaft 16. By this method the spacing between the electrodes 112 and the magnitude of vertical travel of the movable electrode assembly 26 can be changed to accommodate workpieces of varying thicknesses.

In FIG. 10 is shown the mounting of the welding head 10 in a horizontal position by the attachment of the base 12 on an L-shaped mounting bracket 130 by conventional securing means such as bolts (not shown). By securing the bracket to a bench or table (not shown) this arrangement allows long assemblies to pass beneath the head with adequate clearance to allow a greater variety of welding operaitons to be performed since the arrangements of the frame and electrode assemblies as illustrated in FIGS. 6, 7, 8, and 9 may still be made.

While one embodiment of this invention has been herein illustrated and described it will be appreciatedl by those skilled in the art that variations of the disclosed arrangement both as to its details and as to the organization of such details may be made without departing from the spirit and scope thereof. Accordingly, it is intended that the foregoing disclosure and the showing made in the drawings shall be considered as illustrative of the principles of this invention and not construed in a limiting sense.

What is claimed is:
1. A welding head comprising:
   a base member including a cylindrical support member rigidly affixed thereto;
   first rotatable means rotatably mounted to said support member and having positioned therein a movable member and a carrier member having a first axis;
   second rotatable means in juxtaposition to said first rotatable means and rotatably independent thereof including a first clamp member rotatably positioned on said base member and a second clamp member rotatably positioned on said carrier member, both of said clamp members being rotatable about said first axis;
   third rotatable means mounted on said second rotatable means and rotatably independent of said first and second means including a first electrode horn removably positioned in said first clamp member having a first electrode and a second electrode horn removably positioned in said second clamp member having a second electrode; and
   means coacting with said movable member for movement thereof and to transmit said movement to said carrier member to enable said second electrode to move toward said first electrode,
whereby each of said first, second, and third means may be rotated independently into a number of configurations to provide a welding head adapted to numerous welding applications.

2. A welding head comprising:
   a base member including a cylindrical support member rigidly affixed thereto;
   a frame member rotatably mounted to said support member and having positioned therein a movable member and a shaft member having a first axis;
   first and second electrode assemblies in juxtaposition to said frame member and rotatably independent thereof, said first assembly including a first clamp member rotatably positioned on said base member and said second assembly including a second clamp member rotatably positioned on said shaft member, both of said clamp members being rotatable about said first axis;
   a pair of electrode horns each clamped in a different one of said clamp members, said horns being rotatably independent of said frame member and said electrode assemblies;
   a pair of electrodes each of which is adjustably retained by a different one of said electrode horns; and
   means coacting with said movable member for movement thereof and to transmit said movement to said shaft member to enable one of said electrodes to move toward the other electrode,
whereby said frame member, said electrode assemblies and said electrode arms may be rotated independently into a number of configurations to provide a welding head adapted to numerous welding applications.

3. A welding head comprising:
   a base member including a cylindrical support member rigidly affixed thereto;
   first rotatable means rotatably mounted to said support member and having positioned therein a movable member and a carrier member having a first axis;
   second rotatable means in juxtaposition to said first rotatable means and rotatably independent thereof including a first clamp member rotatably positioned on said base member and a second clamp member rotatably positioned on said carrier member, both of said clamp members being rotatable about said first axis;

third rotatable means mounted on said second means and rotatably independent of said first and second means including a first electrode horn removably positioned in said first clamp member having a first electrode and a second electrode horn removably positioned in said second clamp member having a second electrode;

a pair of registering means each in engagement with a different one of said electrode horns and coacting with a different one of said clamp members to provide accurate positioning of said horns in said clamp members; and means coacting with said movable member for movement thereof and to transmit said movement to said shaft member to enable said second electrode to move toward said first electrode, whereby said first, second, and third rotatable means may be rotated independently into a number of configurations to provide a welding head adapted to numerous welding operations.

4. A welding head comprising:

a base member including a cylindrical support member rigidly affixed thereto;

a frame member rotatably mounted to said support member and having positioned therein a movable member and a shaft member having a first axis;

first and second electrode assemblies in juxtaposition to said frame assembly and rotatably independent thereof, said first assembly including a first clamp member rotatably positioned on said base member and said second assembly including a second clamp member rotatably positioned on said shaft member, both of said clamp members being rotatable about said first axis;

a pair of electrode horns each clamped by a different one of said clamp members, said horns being rotatably independent of said frame member and said electrode assemblies;

a pair of electrodes each of which is adjustably retained by a different one of said electrode horns;

a pair of registering blocks each clamped on a different one of said electrode horns and engageable with a different one of said clamp members to provide accurate positioning of said horns in said clamp members; and means coacting with said movable member for movement thereof and to transmit said movement to said shaft member to enable one of said electrodes to move toward the other electrode, whereby said frame member, said electrode assemblies and said electrode horns may be rotated independently into a number of configurations to provide a welding head adapted to numerous welding applications.

5. A welding head comprising:

a base member including a cylindrical support member rigidly affixed thereto;

a frame member rotatably mounted to said support member and having positioned therein a movable member and a shaft member having a first axis;

first and second electrode assemblies in juxtaposition to said frame member and rotatably independent thereof, said first assembly including a first clamp member rotatably positioned on said base member and said second assembly including a second clamp member rotatably positioned on said shaft member, both of said clamp members being rotatable about said first axis;

a pair of electrode horns each clamped by a different one of said horn members, said horns being rotatably independent of said frame member and said electrode assemblies;

a pair of electrodes each of which is adjustably retained by a different one of said electrode horns;

a pair of registering blocks including a tapered pin extending from one side thereof each being mounted on a different one of said electrode horns and having said pin engageable with the aperture in a different one of said clamp members to provide accurate positioning of said horns in said clamp members; and means coacting with said movable members for movement thereof and to transmit said movement to said shaft member to one of said electrodes to move toward the other electrode, whereby said frame member, said electrode assemblies and said electrode arms may be rotated independently into a number of configurations to provide a welding head adapted to numerous welding applications.

References Cited in the file of this patent

UNITED STATES PATENTS

| | | |
|---|---|---|
| 2,474,816 | Briggs | July 5, 1949 |
| 3,036,199 | Page | May 22, 1962 |